United States Patent [19]

Owens et al.

[11] 4,025,177

[45] May 24, 1977

[54] MICROFICHE VIEWER

[75] Inventors: Ben Howard Owens; Clyde Eugene LeFevre, both of Orange; James Patrick Hagan, Laguna Beach, all of Calif.

[73] Assignee: Addressograph Multigraph Corporation, Cleveland, Ohio

[22] Filed: May 8, 1975

[21] Appl. No.: 575,508

Related U.S. Application Data

[60] Continuation-in-part of Ser. No. 464,976, April 29, 1974, abandoned, which is a division of Ser. No. 95,770, Dec. 7, 1970, Pat. No. 3,807,074.

[52] U.S. Cl. .............................. 353/27 A; 209/80.5
[51] Int. Cl.² ...................................... G03B 23/08
[58] Field of Search ...................... 353/27 R, 27 A; 209/80.5

[56] References Cited

UNITED STATES PATENTS

| | | | |
|---|---|---|---|
| 1,276,503 | 8/1918 | Eddy | 209/80.5 |
| 3,528,735 | 9/1970 | Bluitt et al. | 353/27 A |
| 3,645,612 | 2/1972 | Streicher et al. | 353/27 R |
| 3,682,300 | 8/1972 | Heller | 209/80.5 |
| 3,733,122 | 5/1973 | Szymber | 353/25 |
| 3,743,400 | 7/1973 | Haning et al. | 353/27 A |
| 3,797,925 | 3/1974 | Smitzer | 353/27 R |

*Primary Examiner*—Steven L. Stephan
*Attorney, Agent, or Firm*—Sol L. Goldstein; Michael A. Kondzella

[57] ABSTRACT

A microfiche viewer is provided with means for selecting one microfiche carrier from a plurality of microfiche carriers contained within a magazine for holding the same, means for positioning such selected microfiche carrier along a first axis, means for positioning an optical-projecting means along another axis perpendicular to the first axis whereby a preselected frame of a microfiche contained within the carrier can be viewed on a screen and means for replacing the microfiche carrier into the magazine.

1 Claim, 9 Drawing Figures

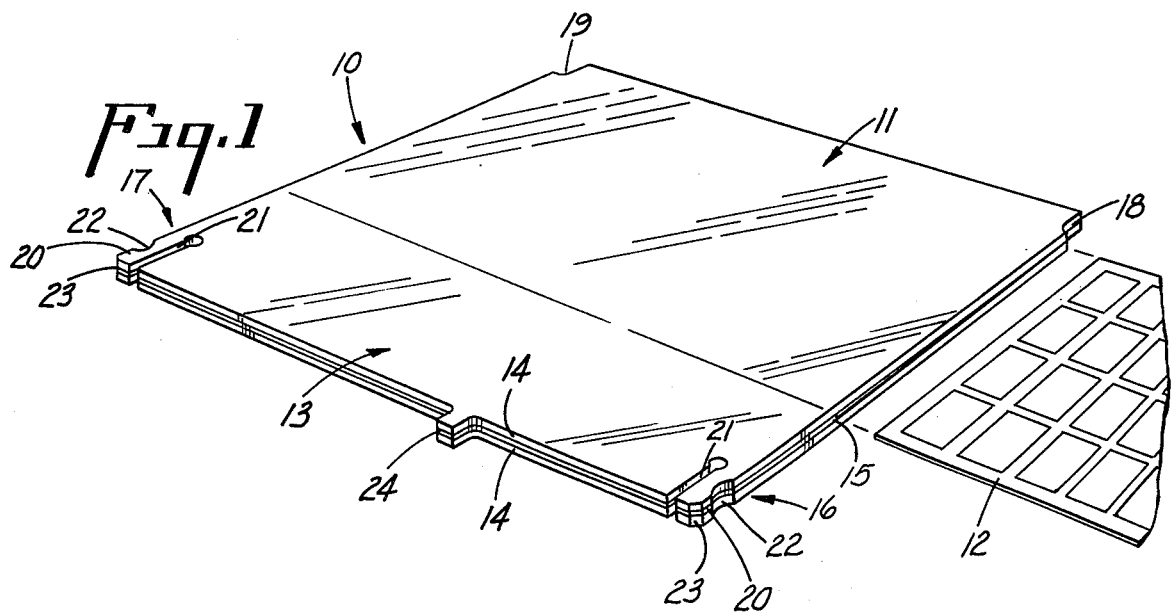
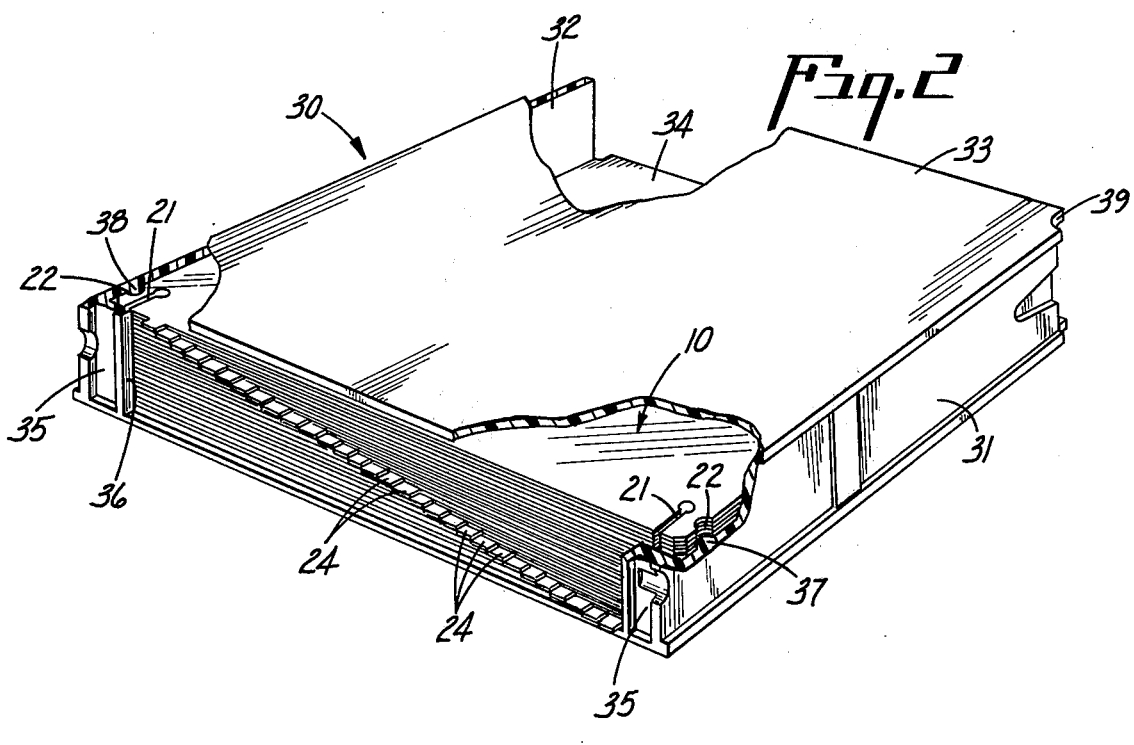

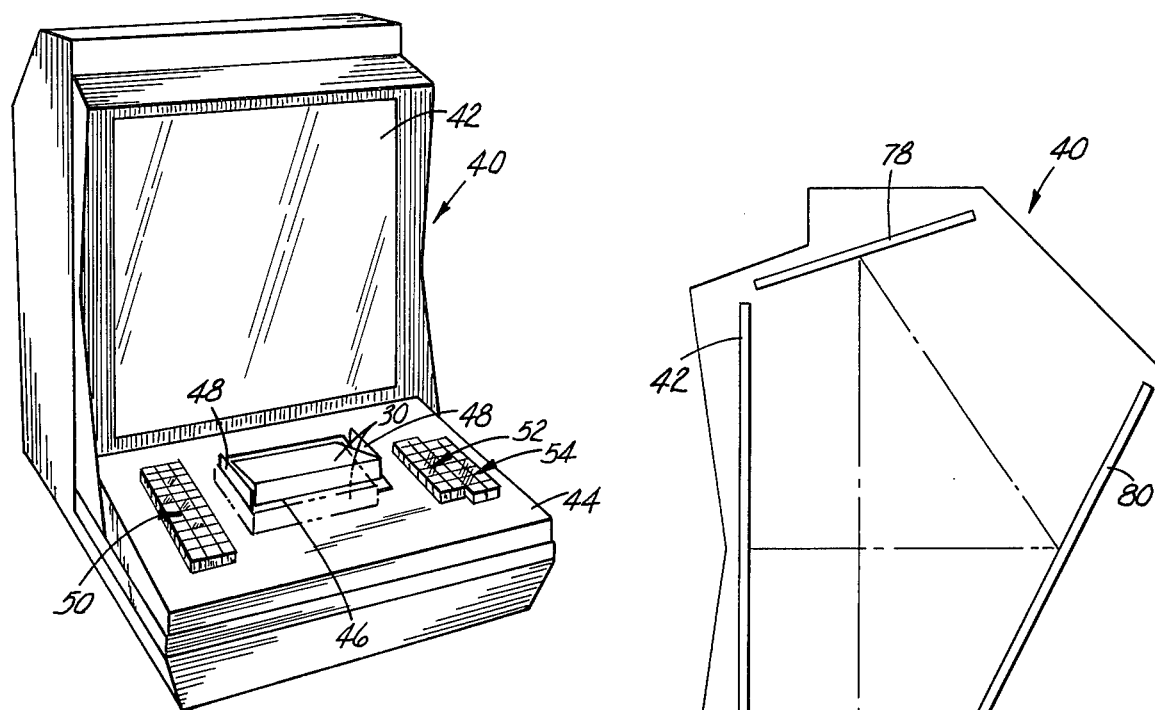
Fig. 3
Fig. 4
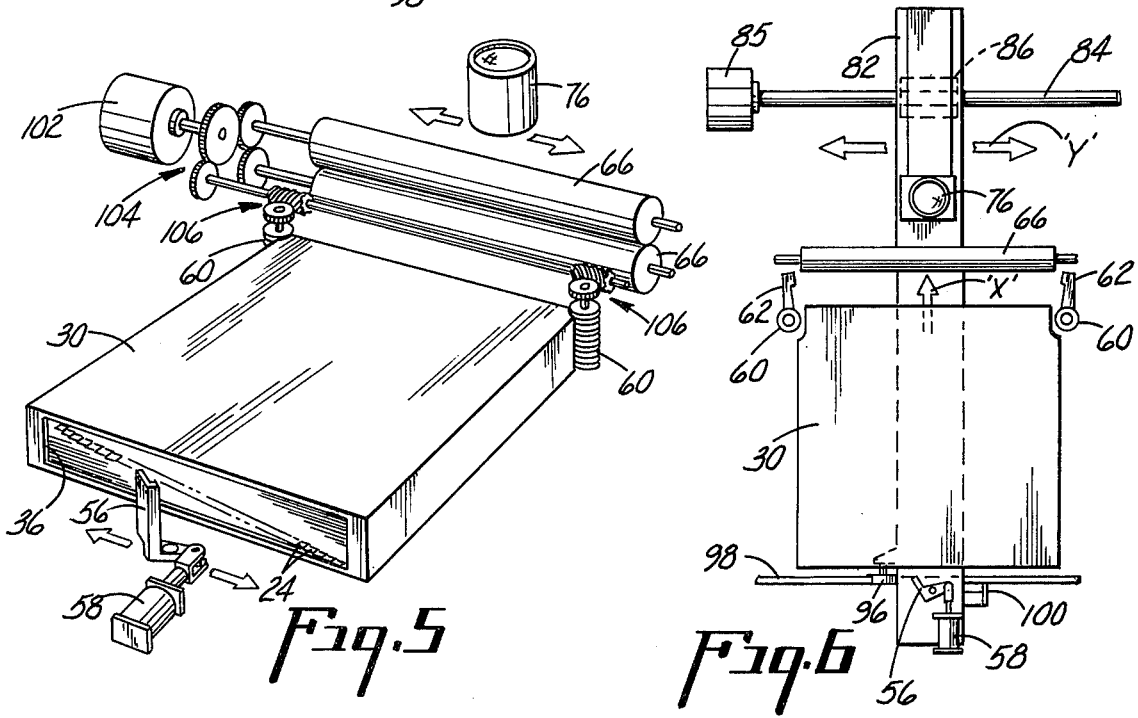
Fig. 5
Fig. 6

MICROFICHE VIEWER

RELATED APPLICATIONS

This is a continuation-in-part of copending application Ser. No. 464,976, filed Apr. 29, 1974, and now abandoned; which is a division of Ser. No. 95,770, filed Dec. 7, 1970, now U.S. Pat. No. 3,807,074.

BACKGROUND OF THE INVENTION

The present invention relates generally to microfiche viewers and more particularly to such viewers wherein a preselected microfiche carrier is automatically positioned for viewing of a predetermined frame of the microfiche.

Because of the present day "information explosion," data are being accumulated at such a rapid rate that compact data storage systems are becoming ever more important. One of the most satisfactory data storage systems thus far devised is that of microfilming, wherein sheets of data, reports, books, blueprints, pictures and the like are photographed in a photographically reduced size. Typically, an entire page then requires an area of about half an inch by five-eighths of an inch. These reduced size "frames" are then sutiably assmbled. This system results in a tremendous compaction of storage space requirements.

One of the early methods of assembling these reduced size frames was to position them, tandem-wise, on a reel of film; but this system had the disadvantage that it became difficult to have access to a single frame without somehow going through every frame that preceded it on the reel.

Another method of assembling the reduced size frames was to print related frames onto a given sheet of film; and this became known as microfiche. In using the microfiche, a single frame is more readily retrieved when desired, providing "random access" to the desired frame.

the microfiche, during its evolution, has taken a number of different sizes, but at the present time there tends to be a standardization. One of the most popular sizes is about 150 millimeters long and about 105 millimeters wide, and this size of microfiche may be designed to contain from about 60 to over 100 frames. Another popular size for microfiche is a film that is about 5 inches long and about 3 inches wide. Other sizes are also in use.

Similarly, microfiche have taken a variety of formats, the available one hundred some frames being used for data, for titles, or for coding.

This diversity of microfiche has hindered the storing and retrieval of microfiche stored data. For example, one arrangement attached a notched metal clip to one edge of the microfiche, the notches being used for data retrieval. Another arrangement notched the actual edge of the microfiche. Still another arrangement utilized punched coding holes along the edge of the microfiche. Some other arrangements used optical approaches and still other arrangements used markings to produce a frequency signal. The main disadvantage of these arrangements was that they required additional equipment and procedures for manufacturing each type of microfiche. Since each arrangement required a different retrieval apparatus, it was extremely difficult to intermix microfiche from different sources.

OBJECTS

It is therefore a principal object of the present invention to provide a microfiche viewer which enables any one of a plurality of microfiche to be selected and viewed.

Another object of the present invention is to provide a microfiche viewer capable of selecting a particular one of a group of microfiche carriers from a magazine, locating the desired frame thereof, projecting a legible image of such desired frame and returning the carrier to the magazine.

A further object of the present invention is to provide a microfiche viewer which is simple and inexpensive to manufacture and which is rugged and dependable in operation.

Other objects and advantages of this invention will become apparent in the course of the following detailed disclosure and description.

SUMMARY OF THE INVENTION

A microfiche viewer is provided with automatic selection and positioning means with which an operator can select a desired microfiche from a magazine containing a plurality of microfiche disposed in individual carriers, view a desired microfiche frame upon a projection screen, and then return the microfiche to the magazine.

The viewer comprises means for partially ejecting a given one of a plurality of microfiche carriers contained within a magazine, means for positioning the ejected microfiche carrier along a first axis, means for positioning an optical projecting means along a second axis perpendicular to the first axis, whereby a preselected frame of the microfiche contained in the ejected microfiche carrier is projected upon a screen for viewing and means for replacing the microfiche carrier into the magazine.

THE DRAWING

FIG. 1 is a perspective view of an improved microfiche carrier;

FIG. 2 is a perspective view of a magazine containing a plurality of microfiche carriers, showing the magazine and a portion of the carriers partially broken away;

FIG. 3 is a perspective view of a microfiche viewer for selecting a desired frame of a microfiche selected from the magazine of FIG. 2 and projecting an image thereof upon a viewing screen;

FIG. 4 is a side elevation of the viewer of FIG. 3;

FIG. 5 is a perspective view of a part of the mechanism of the viewer of FIG. 3 for selecting a microfiche and frame thereof;

FIG. 6 is a plan view of a part of the microfiche and frame selection mechanism;

DESCRIPTION OF THE PREFERRED EMBODIMENTS

Figure 7:
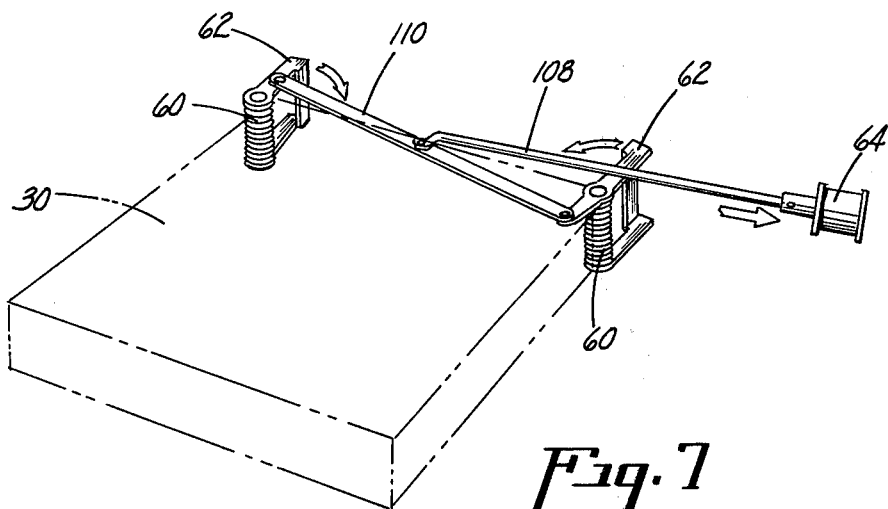
FIG. 7 is a perspective view of the microfiche return kicker mechanism.

FIG. 1 shows a microfiche carrier 10 that takes the form of a plate having a transparent portion 11, adapted to receive a microfiche 12, and an opaque portion 13. Carrier 10 may be formed in any suitable manner, such as by bonding two sheets 14 of a transparent, flexible, slippery material such as Mylar to an opaque sheet 15 of celluloid or other more rigid plastic material so that the two transparent sheets form a folder as shown in FIG. 1. Alternatively, a single transparent sheet can be folded over upon the more rigid plastic material in such a manner that a transparent pocket is formed in the carrier. In any case, the resultant microfiche carrier is a relatively rigid plate in the transparent portion of which a microfiche can be suitably positioned and contained.

Microfiche carrier 10 has two detent elements 16 and 17, positioned at respective front corners thereof and cut-outs 18 and 19 at the rear corners. The illustrated detent elements each comprise an outer flexible leg 20 that can flex transversely, in the manner of a clothes pin. The flexing movement is permitted by a hole-and-slot arrangement 21. Each flexible leg 20 has, on its outer edge, a detent concavity 22, and also has, at its outer end portion, a chamfer 23.

Microfiche carrier 10 also has a coding tab 24 on its front edge. The coding tabs are located at different positions along the front edge of the microfiche carriers so that each tab is offset horizontally from every other tab in a set of carriers.

In use the microfiche carrier of FIG. 1 containing a microfiche is placed, along with other microfiche carriers comprising a set, into a magazine. Because a standard sized carrier is used, microfiche having differing sizes and formats can be intermixed within the magazine.

FIG. 2 shows a magazine 30 in which the front corners and one rear corner have been partially broken away. Magazine 30 holds a plurality of microfiche carriers 10. A portion of the microfiche carriers have also been broken away at the rear corner of magazine 30. Each individual carrier contains an individual microfiche 12. The individual microfiche carriers 10 as shown lay on each other without separation. If desired, the magazine may be divided into compartments by means of a suitable separator in order to reduce the weight of the plurality of carriers upon the bottom carrier in each compartment. Magazine 30 may hold about thirty carriers, and be about ⅝ of an inch in height.

Magazine 30 contains side walls 31 and 32, top 33, bottom 34 and front wall 35 containing window 36. The back of magazine 30 is open. The side walls 31 and 32 contain vertically extending protruding arcuate detent elements 37 and 38. The top 33 contains cut-outs 39 at each of the rear corners.

To load magazine 30 the microfiche carriers 10 are inserted into the open back of magazine 30 with the opaque portion 13 containing flexible legs 20 and tab 24 facing towards the front of magazine 30. When chamfers 23 of flexible legs 20 abut the vertically extending protruding arcuate detent elements 37 and 38 on the side walls 31 and 32 of magazine 30, the flexible legs 20 flex inwardly until the movement of microfiche carrier 10 causes detent elements 37 and 38 to engage detent concavities 22 of flexible legs 20 and hold each microfiche carrier 10 securely in place within magazine 30.

Coding tabs 24 of the various microfiche carriers 10 extend outwardly through window 36 of front wall 35 of magazine 30. These coding tabs are short enough so that they do not extend beyond the limits of the magazine. Moreover, the various coding tabs are shown to be staggered or offset horizontally from each other to enable convenient selection of a desired microfiche. This selection can be performed manually or, if desired, by means of a vertically oriented pusher bar which is moved transversely of magazine 30 and by means of which sufficient force can be exerted upon the selected coding tab to disengage the detent concavities 22 of the selected microfiche carrier 10 from the detent elements 37 and 38 of magazine 30 and to partially eject the selected carrier out of the open back of the magazine.

FIG. 3 shows a microfiche viewer 40 which has the capability of automatically selecting a desired microfiche contained within a microfiche carrier from a magazine 30 and projecting a desired frame of the microfiche upon a viewing screen 42. Cabinet 44 is equipped with magazine tray 46 and guides 48 for holding a magazine 30. Keyboard 50 selects the microfiche carrier and keyboards 52 and 54 select the particular frame to be viewed. Keyboard 52 controls row selection along the X-axis and keyboard 54 controls column selection along the Y-axis.

The optical system of microfiche viewer 40 as shown in FIG. 4 consists of projection lamp 68, condenser lens 70, cold mirror 72, condenser lens 74, lower platen 88, upper platen 90 and projection lens 76, carried by lens carriage assembly 82 and mirrors 78 and 80 viewing screen 42 contained in the upper portion of cabinet 44. Lens carriage assembly 82 is mounted upon Y-axis drive shaft 84 by means of linear actuator 86 which is a type of mechanical transducer for translating rotational motion into rectilinear motion as described in U.S. Pat. No. 3,272,021 to Milton N. Weber. Drive shaft 84 is powered by motor 85 (FIG. 6). Lens carriage assembly 82 also carries microfiche select kicker 56, solenoid 58, wiper 92, potentiometer 94, wiper 100 and carriage roller 96 which rides upon track 98, which also functions as a potentiometer in conjunction with wiper 100.

As shown in FIG. 5, motor 102 drives horizontal drive rollers 66 by means of gear train 104 and side drive rollers 60 by means of worm and gear assembly 106.

Figure 8:
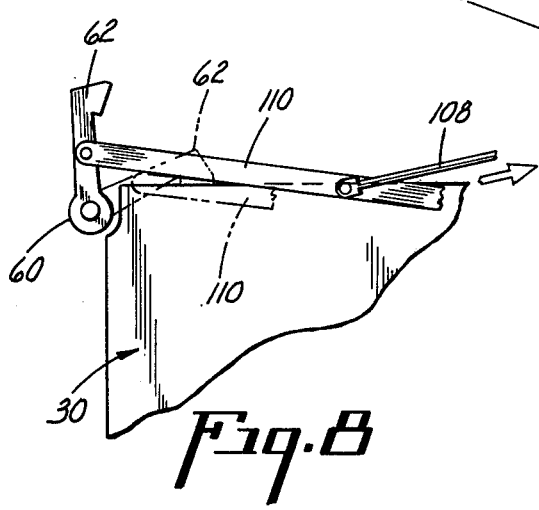
FIG. 8 is a plan view of a part of the microfiche return kicker mechanism showing a kicker abutting a microfiche carrier.

The operation of the microfiche return kickers 62 is controlled by means of solenoid 64 as shown in FIGS. 7 and 8. Solenoid 64 is connected to actuating rod 108 which in turn is linked by means of tie bar 110 to both microfiche return kickers 62.

In operation a magazine 30 containing a plurality of microfiche carriers 10 each containing a microfiche 12 (FIGS. 1 and 2) is placed upon magazine tray 46 and pushed down into the position shown in FIG. 4. The viewer is turned on furnishing power to projection lamp 68 and keyboards 50, 52, and 54. The desired frame of a particular microfiche is then projected upon viewing screen 42 by pushing the appropriate buttons of keyboards 50, 52, and 54.

When a selected button of keyboard 50 is punched power is furnished to motor 85 and motor 102. Motor 85 rotates Y-axis drive shaft 84 causing lens carriage assembly 82 carrying microfiche select kicker 56 to move along the Y-axis until it is in position adjacent the tab 24 of the microfiche carrier containing the desired microfiche. Motor 102 rotates side drive rollers 60 and horizontal drive rollers 66.

Solenoid 58 is actuated causing kicker 56 to strike against tab 24 forming the selected carrier out of magazine 30 into engagement with side drive rollers 60. The rotation of side drive rollers 60 causes the microfiche carrier to be driven out of magazine 30 to the point where the leading edge of the carrier is engaged by horizontal drive rollers 66. Movement of the microfiche carrier along the X-axis continues until the index row of the microfiche is positioned beneath projection lens 76. Simultaneously lens carriage assembly 82 is moved along the Y-axis into position over the index column of the microfiche, resulting in the index frame of the microfiche being projected upon viewing screen 42.

In order to select a particular frame for viewing the desired row and column designations are punched on keyboards 52 and 54. Punching a button on keyboard 52 energizes motor 102 causing horizontal drive rollers 66 to drive the microfiche carrier out of magazine 30 until the row containing the desired frame is positioned under projection lens 76. X-axis potentiometer 94 senses the position of the microfiche carrier by means of wiper 92 and causes it to stop at the selected position. As shown by a dashed line in FIG. 4, the leading edge of the microfiche carrier engages wiper 92. Punching any other button on keyboard 52 to select a second row position will result in motor 102 rotating in a direction to either drive the microfiche carrier farther out of magazine 30 or in the reverse direction depending upon the location of the second selected row position relative to that of the first.

Punching a button on keyboard 54 energizes motor 85 causing drive shaft 84 to rotate moving lens carriage assembly 82 until projection lens 76 is positioned over the column containing the desired frame. Y-axis potentiometer 98 senses the position of lens carriage assembly 82 by means of wiper 100 and causes it to stop at the selected position. Punching any other button on keyboard 54 to select a second column position will result in motor 85 rotating in a direction to move lens carriage assembly 82 to either the right or the left depending upon the location of the second selected row position relative to that of the first.

Figure 9:
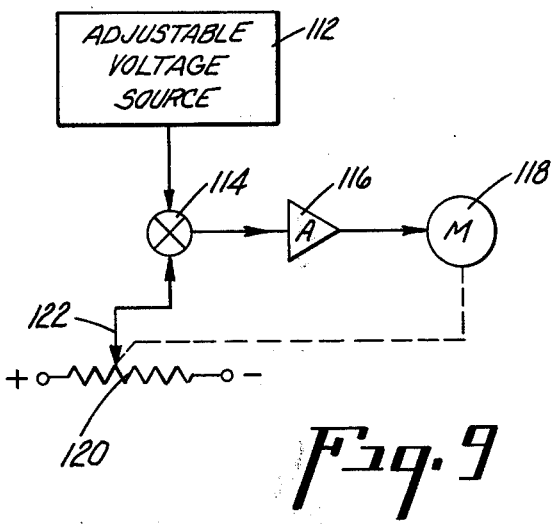
FIG. 9 is a schematic diagram of electrical circuitry for use with the microfiche viewer of FIG. 3.

The operation of the X-axis and Y-axis positioning mechanisms can be better understood by reference to the schematic diagram of an electrical circuit used therein shown in FIG. 9. Adjustable voltage source 112, for example, a voltage divider provides a certain potential to one input terminal of summing network 114. A feedback potential determined by the position of wiper 122 of feedback potentiometer 120 is simultaneously applied to a second input terminal of summing network 114. The output of summing network 114, which corresponds to the difference between the two input potentials and is known as the "error signal" is amplified by amplifier 116. The output of amplifier 116 is applied to motor 118 which is coupled to feedback potentiometer 120 and rotates in a direction to decrease the error signal.

In the case of X-axis positioning the adjustable voltage source 112 is a potential selected by the particular button of keyboard 52 which is punched, motor 118 is motor 102 which drives horizontal drive rollers 66, and feedback potentiometer 120 is potentiometer 94, the feedback potential being determined by the instantaneous position of wiper 92.

In the case of Y-axis positioning the adjustable voltage source 112 is a potential selected by the particular button of keyboard 54 which is punched, motor 118 is motor 85 which drives drive shaft 84, and feedback potentiometer 120 is potentiometer 98, the feedback potential being determined by the instantaneous position of wiper 100.

When it is desired to view a frame upon a different microfiche in magazine 30 punching a different button on keyboard 50 causes horizontal drive rollers 66 and side drive rollers 60 to rotate in a direction to replace the microfiche carrier within magazine 30. When the leading edge of the microfiche carrier passes beyond horizontal drive rollers 66 side drive rollers 60 move the microfiche carrier to within about ⅛ inch of its locked position within magazine 30. At that time solenoid 64 is actuated causing actuating rod 108 to exert a pull upon tie bar 110 which causes microfiche return kickers 62 to pivot in such a manner to force the microfiche carrier into its locked position within magazine 30.

The mircrofiche of this invention provides many advantages over prior art viewers. First of all, it protects individual mircofiche. Second, it permits the selection and display of any selected frame in a random access manner. Third, it permits unlimited storage by having the magazines separate from the viewer and permits the magazine to assume any reasonable size. Fourth, the file integrity is protected because the magazine can contain a complete file or at least a substantial part thereof. Fifth, data are easily updated by removing a given microfiche carrier and replacing the microfiche contained therein with an updated microfiche. Seventh, at no time does the microfiche carrier come completely out of the magazine which eliminates the need for reinserting a carrier into a predetermined position in a stack of carriers. Due to the vertically-oriented microfiche select kicker offset tabs on the microfiche carrier it is unnecessary for a carrier to have a predetermined position in the stack. Thus, a new carrier can be placed at the top of the stack and be readily available for random-acess readout.

This invention has been described with reference to certain specific embodiments and to various suggested conditions of operation. However, other embodiments can be utilized in the practice of this invention. It is therefore intended that this invention is not to be limited except as defined in the following claims.

We claim:
1. A microfiche viewer comprising a magazine,
a plurality of planar microfiche carriers contained within said magazine in parallel relationship, an optical projection assembly movable along a first axis, kicker means mounted on said assembly for partially ejecting from said magazine a carrier selected from said plurality of carriers,
first roller means having an axis perpendicular to the plane of said carrier and perpendicular to said first axis and engageable with side edges of said carrier,
second roller means having an axis parallel to said first axis and engageable with opposing surfaces of said carrier,
first drive means for rotating said first and second roller means to move said selected carrier along a first coordinate,
second drive means for moving said assembly along said first axis perpendicular to said first coordinate,
first sensing means for providing a first feedback potential determined by the instantaneous position of said carrier along said first coordinate, second sensing means for providing a second feedback potential determined by the instantaneous position of said assembly along said first axis,
first selector means for providing a first pre-selected potential,
second selector means for providing a second pre-selected potential carrier along said,
third selector means for providing a third pre-selected potential said assembly along said,
means for summing said first pre-selected potential and said second feedback potential and applying the resulting summed potential to said said second drive means upon activation of said first selector means said second drive means thus positioning said assembly such that said kicker means ejects the selected carrier from said magazine
means for summing said second pre-selected potential and said first feedback potential and applying the resulting summed potential to said first drive means upon activation of said selector means, said first drive means thus positioning said selected carrier along said first coordinate, and
means for summing said third pre-selected potential and said second feedback potential and applying the resulting summed potential to said second drive means upon activation of said third selector means, said second drive means thus positioning said assembly along said first axis perpendicular to said first coordinate.

* * * * *

UNITED STATES PATENT AND TRADEMARK OFFICE
CERTIFICATE OF CORRECTION

PATENT NO. : 4,025,177

DATED : May 24, 1977

INVENTOR(S) : Ben Howard Owens, Clyde Eugene LeFevre, James Patrick Hagan

It is certified that error appears in the above-identified patent and that said Letters Patent are hereby corrected as shown below:

Column 7, line 7, after the word "potential" delete "carrier along said," line 9, after the word "potential" delete "said assembly along said,"

Column 8, line 6, after "said" first occurrence insert "second".

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*